United States Patent [19]

Amir et al.

[11] Patent Number: 4,811,410

[45] Date of Patent: Mar. 7, 1989

[54] LINESCAN INSPECTION SYSTEM FOR CIRCUIT BOARDS

[75] Inventors: Israel Amir, Trenton; William C. Balchunas, Mendham; Frank P. Higgins, Trenton, all of N.J.

[73] Assignee: American Telephone and Telegraph Company, New York, N.Y.

[21] Appl. No.: 111,954

[22] Filed: Oct. 23, 1987

Related U.S. Application Data

[63] Continuation of Ser. No. 939,506, Dec. 8, 1986, abandoned, which is a continuation-in-part of Ser. No. 813,756, Dec. 27, 1985, abandoned.

[51] Int. Cl.[4] .............................................. G06K 9/03
[52] U.S. Cl. ...................................... 382/8; 382/56; 358/106; 356/237
[58] Field of Search .................. 382/8, 9, 33, 48, 56, 382/67; 356/237, 394; 358/106, 107, 183; 364/562, 563

[56] References Cited

U.S. PATENT DOCUMENTS

| | | | |
|---|---|---|---|
| 3,962,681 | 6/1976 | Requa et al. | 382/67 |
| 4,240,750 | 12/1980 | Kurtz et al. | 356/237 |
| 4,379,308 | 4/1983 | Kosmowski et al. | 356/394 |
| 4,473,842 | 9/1984 | Suzuki et al. | 358/106 |
| 4,545,070 | 10/1985 | Miyagawa et al. | 382/48 |
| 4,569,079 | 2/1986 | Yoshida | 382/48 |
| 4,570,181 | 2/1986 | Yamamura | 382/48 |
| 4,578,810 | 3/1986 | MacFarlane et al. | 382/8 |

Primary Examiner—Leo H. Boudreau
Assistant Examiner—Donald J. Daley
Attorney, Agent, or Firm—Robert B. Levy

[57] ABSTRACT

Inspection of a surface (14) on a circuit board (10) to detect for defects, such as misinserted leads (18—18) or missing or mis-sized components (20'—20'), is accomplished by directing beams of light (34—34) towards the surface along a first angular direction. The intensity of the light reflected along a second direction from each of a plurality of successive thin strips (40—40) running across the surface (14) is sensed by a linescan camera (36) which moves relative to the circuit board. The output signals produced by the linescan camera, as the linescan camera moves across the circuit board, are processed to obtain image data representative of each of the strips. Only the image data representative of predetermined regions (75—75) within each strip where defects may occur are retained. The retained image data are then analyzed to determine if defects are present.

20 Claims, 10 Drawing Sheets

INTENSITY PROFILE ⟶

LINESCAN INSPECTION SYSTEM FOR CIRCUIT BOARDS

RELATED APPLICATIONS

This application is a continuation-in-part of U.S. pat. application, Ser. No. 813,756, filed Dec. 27, 1985, now abandoned.

TECHNICAL FIELD

This invention relates generally to a method and apparatus for inspecting a substrate for defects in predetermined regions thereon.

BACKGROUND OF THE INVENTION

Most pieces of electronic equipment produced today incorporate one or more circuit boards having different types of electronic components thereon. Each component typically has two or more leads which are inserted through apertures in the circuit board and then solder-bonded thereto. Presently, the trend in electronics is towards reducing the physical dimensions of electronic components to allow for greater component density on a given size circuit board, thus giving rise to a greater number of leads, each connected to a mettalized area on the circuit board. For a typical board, having 50 to 100 components thereon, there may be as many as 5000 component leads each inserted through apertures in the circuit board.

In the past, inspection of the circuit board to determine whether each lead has been inserted through a corresponding aperture and then connected to a corresponding metallized area has been accomplished visually by a human operator. However, as the component density on the circuit board has increased, human operators have experienced greater difficulty in visually inspecting the circuit board for defects. Occasionally, even an experienced operator will fail to detect defects in the form of a missing or misinserted component lead. Moreover, few if any human operators can inspect circuit boards at the same speed at which they are produced.

Because of the difficulties associated with manual inspection of circuit boards, much effort has been devoted to developing machine vision systems for performing this task. One type of vision system now in use for inspecting circuit boards comprises a television camera coupled to an image-processing system. The television camera converts the image of the circuit board into video signals which are processed by the image-processing system to detect defects such as missing or misconnected component leads.

The drawback of machine vision systems which utilize a television camera is that the reduction is limited. Typically, the maximum area that can be viewed on the circuit board by a television camera, while still maintaining sufficient resolution to detect the preesnce of a component lead, is on the order of 2"×2". For circuit boards having a surface area larger than 2"×2", the television camera must be moved or stepped across the surface of the circuit board to capture the entire image thereof. Depending on the size of the circuit board, the time consumed in moving the television camera thereacross can be significant, as long as 1 to 2 minutes. As a result, the circuit board throughput of such inspection systems is limited.

Inspection of circuit boards can also be accomplished by vision systems which incorporate a linescan vision camera in place of a television camera. In contrast to a television camera which utilizes a light pick-up device capable of resolving a large two-dimensional image, the linescan camera comprises a plurality of charge-coupled devices, each capable of resolving a very small two-dimensional image. Typically, the linescan camera has 2048 such charge-coupled devices arranged in a linear, one-dimensional array at the image plane of a lens. Depending on the optical characteristics of the lens, each charge-coupled device can typically have a field of view as small as 0.004"×0.004".

Each charge-coupled device within the linescan camera produces an analog signal varying in intensity with the image within the field of view thereof. Thus, the linear array of charge-coupled devices within the linscan camera collectively serves to capture the image of a thin strip of surface area (e.g., 0.004" wide) running across the circuit board. By moving (scanning) the linescan camera across the circuit board, the image of each of a plurality of successive strips of area on the surface thereof can be captured. Depending on the dimensions of the circuit board, only a single pass of the linescan camera across the circuit board along a single axis thereof is all that is required in order to capture the entire image thereof.

In practice, the analog signal from each of the charge-coupled devices in the linescan camera is output in serial fashion on one or more signal lines. Each analog signal is converted to a digital signal for ease of processing. For each successive strip on the surface of the circuit board within the field of view of the linescan camera, there will be 2048 such digital signals. As may be appreciated, during the scanning of the circuit board by the linescan camera, a large number of digital signals are thus generated.

There are generally two techniques for handling the large number of digital signals arising during the scanning of the circuit board by the linescan camera. The first technique is to process these digital signals immediately after they are generated (i.e., process them "on-the-fly"), storing only a very small number of digital signals associated with the image of one or more strips of area on the surface of the circuit board. The processing of these signals is done by a dedicated high-speed processor which utilizes a particular algorithm designed to inspect for a specific kind of defect, i.e., missing component leads. The flexibility afforded by this technique is extremely limited because the handling and processing of input data from the linescan camera is tied to inspection for the specific defect. To inspect for another kind of defect usually requires that all of the algorithms be changed, which may require extensive reprogramming of the image-processing system.

The other technique for handling the digital signals arising during scanning of the circuit board by the linescan camera is to store all the data in a memory for subsequent processing. Since 1 byte (8 bits) of memory is required to store the image of each 0.004"×0.004" area on the circuit board, nearly 4 megabytes of memory would be required to store the digital signals representing the image of an 8"×8" circuit board. The advantage of this technique is that since the image data are stored in memory, the data can be analyzed for different kinds of defects without necessarily changing the manner in which incoming data are handled. However, even though the cost of memory devices has recently dropped, storing all of the digital signals produced during scanning of the circuit board by the linescan camera is generally not as desirable as processing the signals "on-the-fly." Storing the output data of the linescan camera before processing lengthens the inspection process.

Accordingly, there is a need for a technique for rapidly and efficiently inspecting a surface on a substrate, such as a circuit board, for defects thereon using a linescan camera.

SUMMARY OF THE INVENTION

The above-described problems associated with the prior art techniques for inspecting a surface on a substrate to detect for defects thereon are overcome by the method of the present invention. The method is initiated by directing light towards the surface of the circuit board. The intensity of the light reflected from a thin strip of area running across the surface is sensed at a light-sensing means spaced therefrom. A relative motion is imparted between the light-sensing means and the substrate so that the light-sensing means senses the intensity of the light reflected from each of a plurality of successive strips of area on the surface and produces an output signal which varies accordingly. The output signals of the light-sensing means are processed to obtain image data representative of each of the successive strips of area, and only the image data representative of predetermined regions of interest within each strip are retained. The retained data are then analyzed to inspect for defects within the predetermined regions of interest within each of the successive strips on the surface of the substrate.

DETAILED DESCRIPTION OF THE INVENTION

Figure 1:
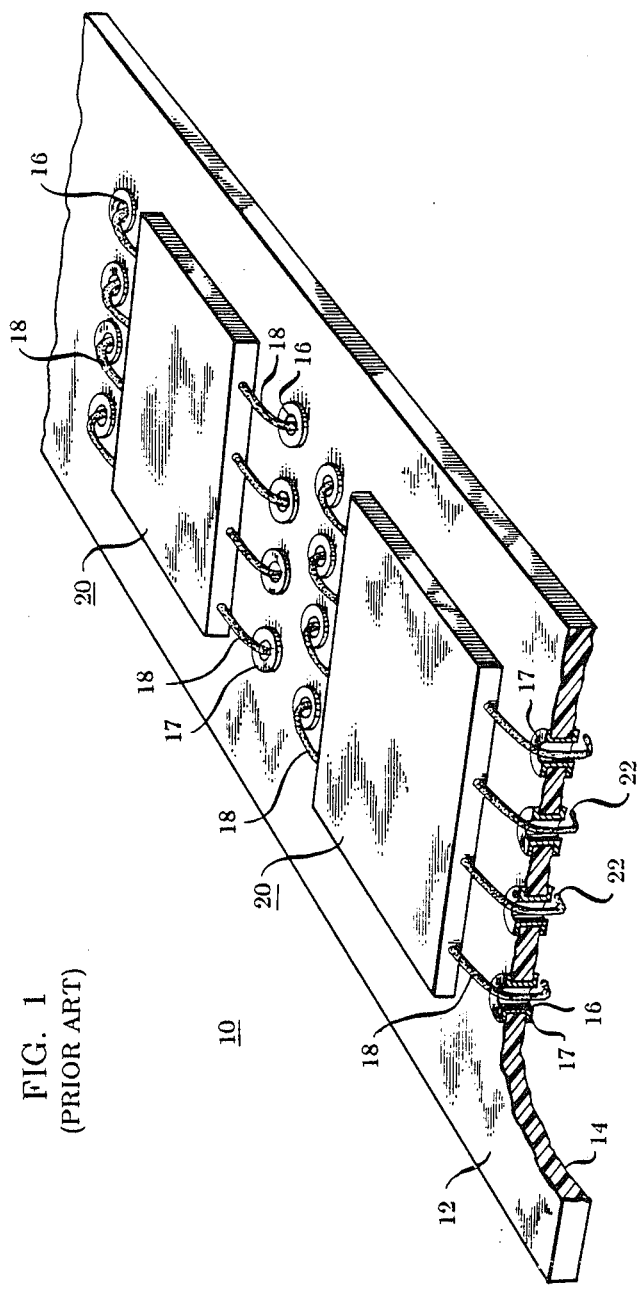
FIG. 1 is a perspective view of a circuit board having components mounted thereon.

FIG. 1 is a partial perspective view of a substrate 10 which, in an exemplary embodiment, comprises a circuit board having upper and lower major surfaces 12 and 14, respectively. A plurality of plated apertues 16-16, each typically 0.036" in diameter, extends through the circuit board 10 between the surfaces 12 and 14. On each of the surfaces 12 and 14 is a plurality of mettalized rings 17-17, each surrounding a corresponding one of apertures 16-16, and each electrically connected to the plating within the aperture. Conductive metal foils (not shown) are provided on one or both of the surfaces 12 and 14 to selectively interconnect the rings 17-17.

The apertures 16-16 are arranged in a plurality of patterns, each corresponding to the pattern of leads 18-18 on a respective one of a plurality of electronic components 20-20. In practice, the leads 18-18 on the components 20-20 are automatically inserted into the apertures 16-16 so that the components are supported from the surface 12. Typically, the leads 18-18 are of such a length that after insertion into the apertures 16-16, each lead has its tip portion 22 protruding slightly below the lower surface 14 on the circuit board 10. To prevent the leads 18-18 from leaving the apertures 16-16, the tip portion 22 of one or more leads of each component 20 is bent (clinched) against the lower surface 14.

During the insertion of the leads 18-18 into the apertures 16-16, errors can occur. For example, if one of the leads 18-18 is misaligned or missing, then the lead cannot be inserted into the corresponding aperture 16. Even if only one of the component leads 18-18 has not been properly inserted, the circuit board 10 will likely be defective. From the standpoint of minimizing repair costs, far less expense is incurred in repairing the circuit board 10 during the fabrication process as compared to the cost of repairing the circuit board in the field.

Figure 2:
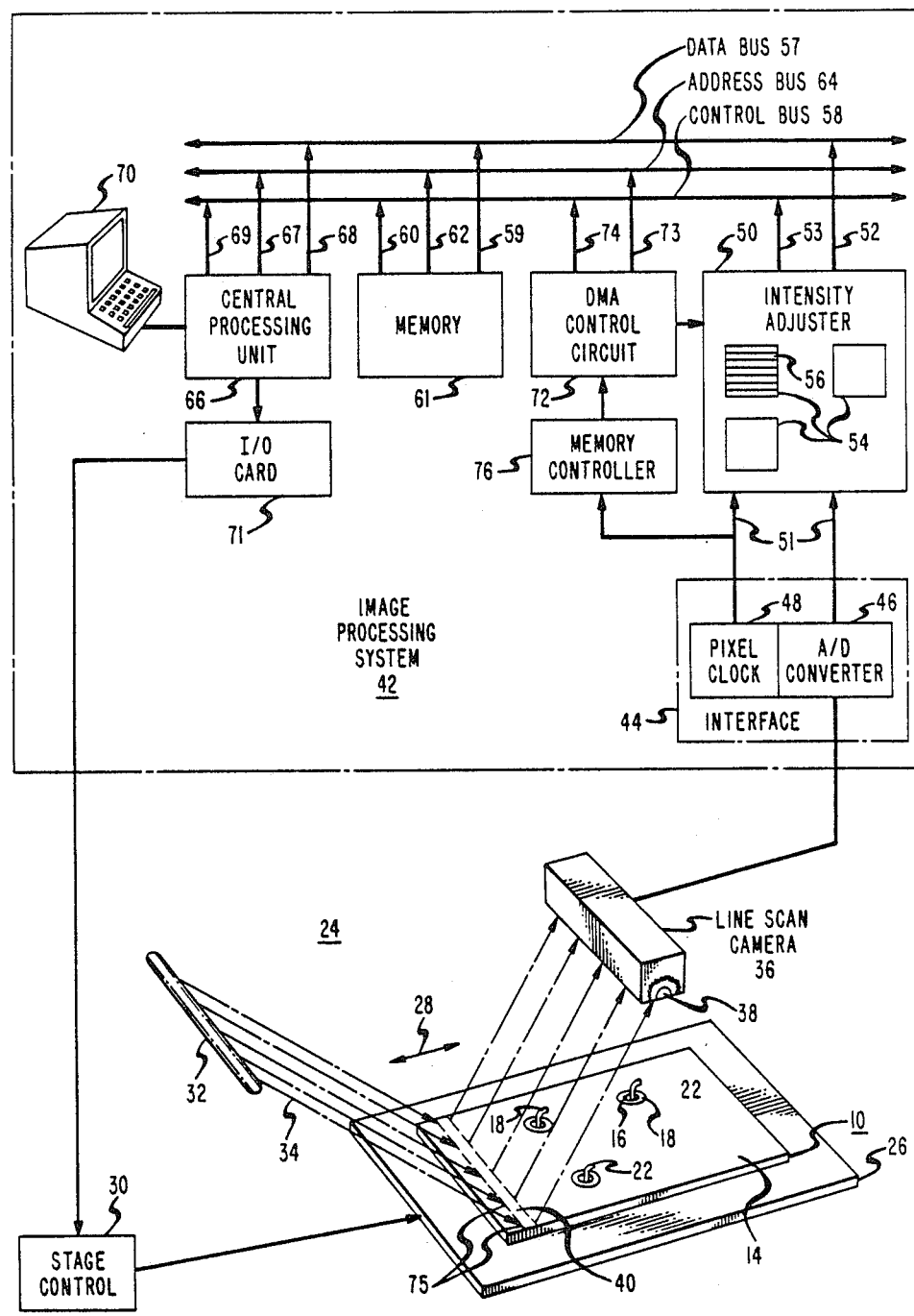
FIG. 2 is a block diagram of an apparatus for inspecting the circuit board of FIG. 1 to determine if defects are present in the predetermined regions of interest on the surface thereof.

FIG. 2 is a block schematic diagram of an apparatus 24, according to the present invention, for inspecting the circuit board 10 for defects such as missing or misinserted component leads 18-18. The apparatus 24 comprises a stage 26 on which the circuit board 10 is mounted so the lower surface 14 thereof is face-up. The stage 26 moves the circuit board 10 linearly along an axis, represented by the double-ended arrow 28, under the control of a stage control 30. In an exemplary embodiment, the stage 26 and the stage control 30 comprise a model 7-20 stage and a model IA-1 stage control, respectively, manufactured by Anorad Corporation of Happague, New York.

A lamp 32 (e.g., a tubular quartz halogen bulb) is spaced from the surface 14 of the circuit board 10 for directing a plurality of parallel rays 34-34 towards the surface along a first angular direction. The rays 34-34 illuminate the tip portion 22 of each protruding lead 18, as well as the metal rings 17-17 on the surface 14 which surround the apertures 16-16. Each lead 18 protruding beyond the corresponding aperture 16 serves to partially block the rays 34-34 from striking the surrounding ring 17, causing a shadow to be cast thereon.

A linescan camera 36 is spaced from the surface 14 a short distance away from the lamp 32 to sense the radiation reflected along a second angular direction from the tip portions 22-22 of the leads 18-18 and from the metal rings 17-17. In an exemplary embodiment, the linescan camera 36 comprises a model CCD1500R camera made by Fairchild Industries, Palo Alto, Calif. Within the camer 36 is a plurality of individual charge-coupled devices 38-38 (only one of which is shown).

Each charge-coupled device 38 comprises a semiconductor having an exposed region of silicon (not shown). While the exposed region of silicon within the charge-coupled device 38 is struck by photons of light, free electron-hole pairs are created therein, the number of electron-hole pairs varying with the intensity of the incident radiation. The free electron-hole pairs (referred to as a charge packet) are representative of a small portion or picture element (pixel) of the image of each strip 40. The charge packet is transferred by charge coupling through a long gate electrode (not shown) on the charge-coupled device 38 to an output gate. An amplifier (not shown) converts the charge present at the output gate of the charge-coupled device 38 into an analog voltage. The respective analog signals from the charge-coupled devices 38-38 are output in a serial fashion from the camera 36.

In practice, the linescan camera 36 has two thousand forty-eight (2048) charge-coupled devices 38-38 arranged in a horizontal linear array located at an image plane of a lens (not shown) carried by the linescan camera. The optical characteristics of the lens are chosen so that each charge-coupled device 38 has a field of view on the order of 0.004"×0.004", and thus, each charge-coupled device captures the image of a like-sized area of pixel on the surface 14. The linear array of charge-coupled devices 38-38 within the camera 36 can collectively capture the image of a thin (e.g., 0.004" wide) strip 40 of the area (shown in phantom) running across the surface 14 perpendicular to the axis 28.

The output signal of each of the charge-coupled devices 38-38 of the camera 36 is supplied to an image-processing system 42 which processes the signals to detect for defects on the surface 14, such as the absence of one of the leads 18-18 protruding beyond the corresponding aperture 16. The image-processing system 42 includes an interface 44 which serves to convert the analog signals produced by the charge-coupled devices 38-38 into digital signals. The interface 44 includes an analog-to-digital (A/D) converter 46 which is controlled by a free-running clock 48 that produces an eleven-(11) bit output signal, the nine (9) most significant bits of which provide a monotonically increasing count from 0 to 511. Upon each transition of the eleven-(11) bit output signal of the clock 48, the A/D converter 46 converts the output signal of a successive one of the charge-coupled devices 38-38 of the camera 36 into a seven-(7) bit digital signal. The adjective "pixel" is used to describe the clock 48 because the eleven-bit output signal thereof is indicative of a separate one of the 2048 0.004"×0.004" pixels within each strip 40 on the surface 14 whose image has been captured by the associated charge-coupled devices 38-38.

The nine most significant bits of the output count of the clock 48 and the seven-bit output signal of the A/D converter 46 are supplied to an intensity adjuster 50. The intensity adjuster 50 adjusts the value of each seven-bit digital output signal of the A/D converter 46 to compensate for nonuniformities in the illumination of the surface 14 on the circuit board 10 which might adversely affect the image thereof. In an exemplary embodiment, the intensity adjuster 50 comprises a 64K×8-bit memory having sixteen address lines 51-51 (only one shown), eight data lines 52-52 (only one shown) and a control line 53. Stored within the intensity adjuster 50 are five hundred twelve (512) pages 54-54 of data, each page containing one hundred twenty-eight (128) data blocks 56-56. Each data block 56 within each page 54 consists of an eight-bit word which represents the compensated value for each one of a block of four, seven-bit digital signals produced by the A/D converter 46.

In order for the intensity adjuster 50 to produce the correct compensated value, the least significant seven of the sixteen address lines 51-51 of the intensity adjuster are supplied with the seven-bit output signal of the A/D converter 46. The nine most significant address lines 51-51 of the intensity adjuster 50 are supplied with the nine most significant bits of the output signal of the pixel clock 48. The nine-bit signal from the pixel clock 48 serves to designate an associated one of the pages 54-54 within the intensity adjuster 50. The seven-bit output signal of the A/D converter 48 designates an associated one of the blocks 56-56 within the designated page 54 containing the correct compensated intensity value for each of the charge-coupled devices 38-38 within a corresponding block of four devices. The particular block of four charge-coupled devices 38-38 is identified by the nine most significant bits of the output signal from the pixel clock 48.

The intensity adjuster 50 has the data lines 52-52 and the control line 53 thereof coupled via a data bus 57 and a control bus 58, respectively, to a set of data lines 59-59 (only one shown) and a control line 60, respectively, of a memory 61. Data from the intensity adjuster 50 is transferred along the data bus 57 to the memory 61 for storage therein. The memory 61 has a set of address lines 62-62 (only one shown) coupled to an address bus 64. The address bus 64 carries address information to the address lines 62-62 of the memory 61 specifying the location within the memory where corresponding data is to be stored or retrieved.

The information stored within the memory 61 is processed by a central processing unit 66, typically a microprocessor, to detect for defects on the surface 14. To enable the information contained within the memory 61 to be transferred to the central processing unit 66 for processing thereby, the central processing unit has a set of address lines 67-67 (only one shown) coupled to the address bus 64. Address information, indicative of the location of the stored data within the memory 61 which is to be processed, is supplied to the memory along the address bus 64 from the central processing unit 66.

The central processing unit 66 has a set of data lines 68-68 (only one shown) coupled to the data bus 57 to enable data from the memory 61, stored at the location specified by the address information supplied to the memory, to be transferred to the central processing unit. A control line 69 from the central processing unit 66 is coupled to the control bus 58 to enable a control signal to be put on the bus by the central processing unit to indicate that the memory 61 is presently being accessed thereby. Program instructions for the central processing unit 66 are typically entered thereto via a terminal 70.

In addition to processing the data stored in the memory 61, the central processing unit 66 also serves to control the movement of the stage 26. Command signals, indicative of the desired movement of the stage 26 are supplied from the central processing unit 66 to the stage control unit 30 via an input/output card 71. Signals from the stage control unit 30, indicative of the position of the stage 26 along the axis 28, and hence which of the strips 40-40 on the surface 14 is within the field of view of the linescan camera 36, are supplied to the central processing unit 66 via the input/output card 71.

A direct memory address (DMA) control circuit 72, well known in the art, is provided within the image processing system 42 to control the transfer of data from the intensity adjuster 50 to the memory 61. The DMA control circuit 72 has a set of address lines 73-73 (only one shown) coupled to the address bus 64 so that address information within the DMA control circuit, indicative of the location in the memory 61 where data is to be stored, can be supplied to the memory. The DMA control circuit 72 has a control line 74 coupled to the control bus 58 to allow the DMA control circuit to sense whether there is a control signal on the control bus from the central processing unit 66, indicating that data transfer between the central processing unit and the memory 61 is occurring. When there is a control signal on the control bus 58 from the central processing unit 66, the DMA control circuit 72 will not permit data transfer from the intensity adjuster 50 to the memory 61. The DMA control circuit 72, when it finds no control signal on the control bus 58, will put a signal on the control bus when data transfer from the intensity adjuster 50 to the memory 61 is to occur. This is done to alert the central processing unit 66 not to access the memory 61 at this time.

Ordinarily, the DMA control circuit 72 would not discriminate among the digital signals produced by the intensity adjuster 50. Thus, the DMA control 72 would normally cause all of the digital signals produced by the intensity adjuster 50 to be transferred along the data bus 57 to the memory 61 for storage. Depending on the size of the circuit board 10 scanned by the linescan camera 36, there may be as many as 4 megabytes of image data produced by the intensity adjuster 50 over time. Accordingly, the memory 61 would normally have to be sized large enough to store all of the data produced by the intensity adjuster 50.

However, the storage size of the memory 61 can advantageously be reduced if only the image data representing the pixels within each of a plurality of predetermined regions 75-75 of interest (shown in phantom) in each strip 40 are retained. For example, when circuit board 10 is to be inspected for missing and misinserted leads 18-18, the only regions 75-75 of interest within each strip 40 are those which contain any part of any of the apertures 16-16 and the surrounding rings 17-17. Since the only location where the leads 18-18 will be present is within the apertures 16-16, there is no need to retain the image data associated with those regions 75-75 not containing any part of the apertures or the surrounding rings 17-17. In practice, the regions 75-75 are each the same width as the strip 40 (e.g., 0.004") but are of different lengths, depending on whether the region contains any part of one of the apertures 16-16 and the surrounding rings 17-17 or not.

Figure 3:
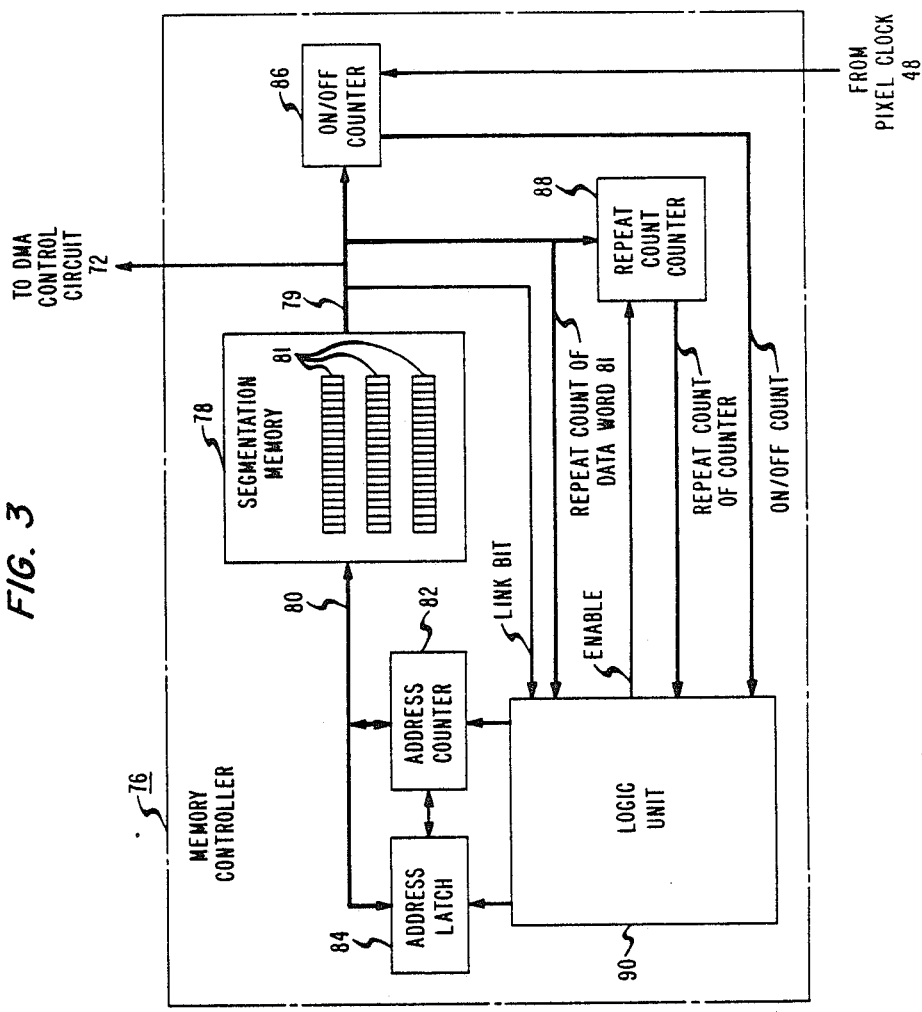
FIG. 3 is a block schematic diagram of a memory controller comrising part of the apparatus of FIG. 2.

To enable the DMA control circuit 72 to discriminate between image data which is to be stored in memory 61 and that which is not, the image-processing system 42 includes a memory controller 76 coupled to the DMA control circuit 72. The details of the memory controller 76 are best illustrated in FIG. 3. Referring to that figure, the memory controller 76 includes a segmentation memory 78 (e.g., 64K × 16 bits), which has sixteen data lines 79-79 (only one shown) and sixteen address lines 80-80 (only one shown). Stored within the segmentation memory 78 are sixty-five thousand five hundred thirty-six (65,536) sixteen-bit data words 81-81, each containing information descriptive of a separate one of the regions 75-75 (see FIG. 2) within a separate one of the strips 40-40 (see FIG. 2).

Table I graphically depicts the arrangement of information contained within each data word 81 stored in the memory 78.

TABLE I

| On/Off Bit | Link Bit | On/Off Count | Repeat Count |
|---|---|---|---|
| X | X | XXXXXXXXXX | XXXX |

The first or highest order bit within each data word 81 is designated as an "on/off" bit. The status of the 81 on/off bit (which is either a binary "one" or "zero") determines whether data from the intensity adjuster 50 (see FIG. 2) representative of the image of a particular region 75, is to be stored in the memory 61 (see FIG. 2) or not. If the region 75 encompasses any part of one of the apertures 16-16 and its surrounding ring 17, then, the on/off bit is a binary "one" to signify that the data from the intensity adjuster 50 is to be stored in memory 61 of FIG. 2. Otherwise, the on/off bit will be "binary zero," and the data is skipped.

The second highest order bit in each data word 81 is designated as a "link bit." The status of the link bit signifies whether the region 75 described by the data word 81 is physically located at one of the ends of the strip 40 (see FIG. 2). If the link bit is a binary "one," then the region 75 is not at the end of the strip 40. Conversely, a binary "zero" link bit indicates otherwise.

The next ten bits after the link bit are designated as the on/off count. The value of the on/off count represents the length of each region 75, as measured in blocks of 4 pixels each. Since a pixel is defined as the 0.004"×0.004" image captured by a particular one of the charge-coupled captured by a particular one of the charge-coupled devices 38-38 of FIG. 2, the on/off count represents one-quarter of the number of successive charge-coupled devices whose signals are skipped or stored, depending on the status of the on/off bit. For example, when the on/off bit is a binary "one," and on/off count of "one" (binary) will cause the image captured by four adjacent charge-coupled devices 38-38 to be stored.

The four least significant bits of each data word 81 are designated as a "repeat count". The repeat count is indicative of the number of strips 40-40 which have the same pattern of regions 75-75. In other words, the regions 75-75 of one strip 40 are each of the same length as the corresponding regions in the next successive strip. Often, the pattern of regions 75-75 in one strip 40 on the surface 14 is repeated for several successive strips. Thus, when the pattern of regions 75-75 is the same for several strips 40-40, the regions within the strips can be described by the same set of data words 81-81.

The set of data words 81-81 associated with the first of the several identical strips 40-40 can thus be repeated "the repeat count" number of times to describe the regions 75-75 in each of the successive strips 40-40 which are identical. Using a repeat count to specify how often the pattern of regions 75-75 within the strip 40 is to be repeated greatly reduces the amount of memory required to store the data words 81-81. As can now be appreciated, the link bit serves to identify the end of a repeatable pattern of regions 75-75 in the strip 40. The repeat count is always greater than zero.

Still referring to FIG. 3, the address lines 80-80 of the segmentation memory 78 are coupled to an address counter 82. The count which is placed by the address counter 82 on the address line 80-80 of the segmentation memory 78 causes the segmentation memory to output, on the data lines 79-79 thereof, the data word 81 stored at the address corresponding to the count of the counter. Typically, the first descriptive data word 81 in the segmentation memory 78 is stored at the first address (zero). The output count of the address counter 82 is latched in a latch 84 whose output is coupled to the input of the counter.

The segmentation memory 78 has the most significant (highest order) one of the data lines 79-79 thereof coupled to the DMA control circuit 72 of FIG. 2. The highest order data line of the segmentation memory 78 carries the on/off bit of the data word 81 stored at the address placed on the address lines 80-80. When the on/off bit supplied to the DMA control circuit 72 of FIG. 3 is a binary "one," the DMA control circuit enables the intensity adjuster 50 of FIG. 3 so that data therefrom are transferred along the data bus 57 of FIG. 2 to the memory 61 of FIG. 2.

The most significant ten of the least significant fourteen data lines 79-79 of the segmentation memory 78 of FIG. 3 carry the on/off count of the addressed word 81 to a counter 86 (referred to as the "on/off counter"). The on/off counter 86 serves to decrement the value of the on/off count stored therein by unity each time the count represented by the most significant nine bits of the pixel clock 48 of FIG. 2 changes. The least significant four data lines 79-79 of the segmentation memory 78 carry the repeat count of the addressed word 81 to a counter 88, referred to as the "repeat count" counter.

Figure 4:
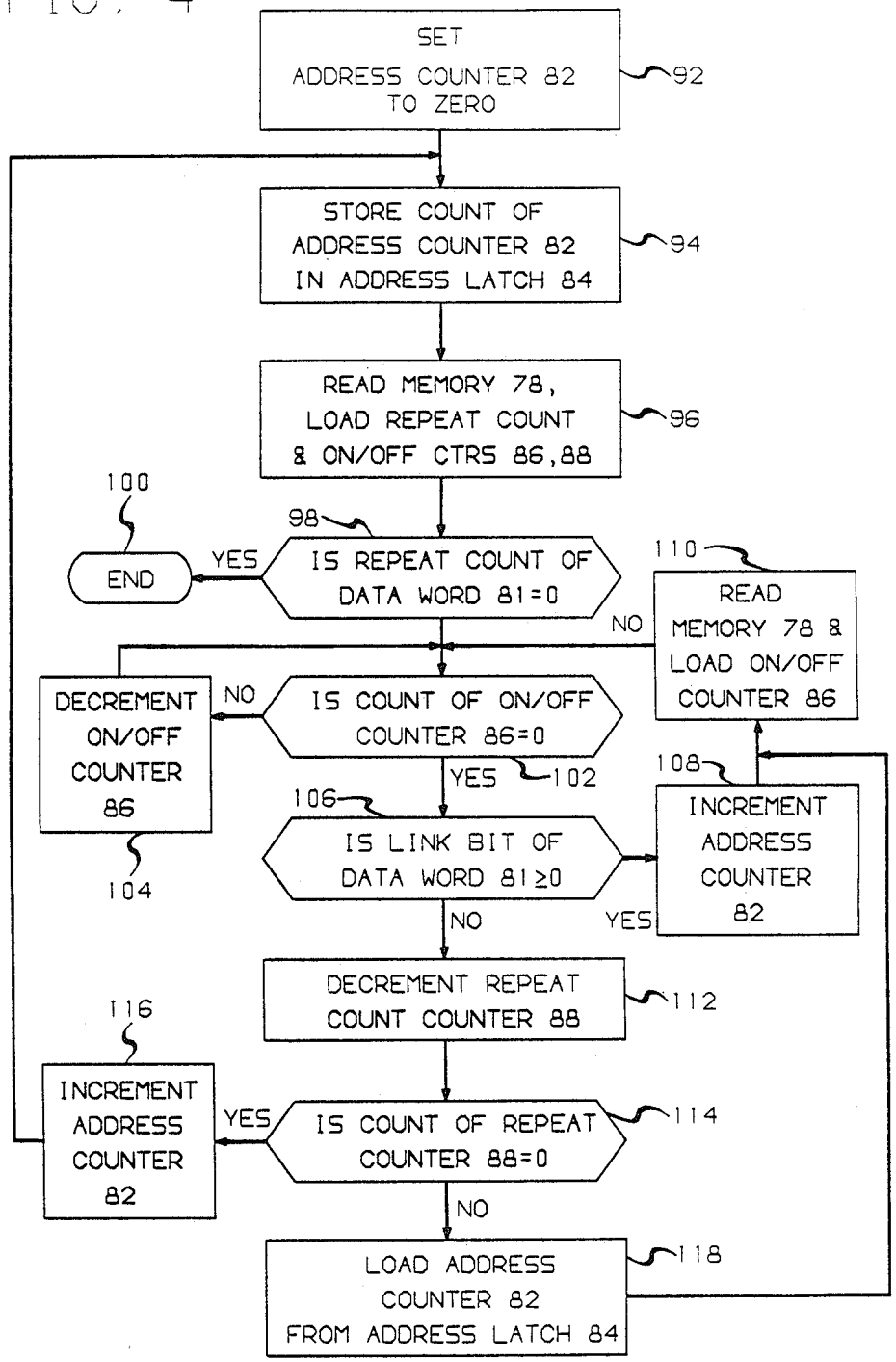
FIG. 4 is a flowchart diagram of a program executed by the memory controller of FIG. 3.

The address, on/off, and repeat count counters 82, 86 and 88, respectively, the address latch 84 and the segmentation memory 78 are coupled to a logic unit 90. The logic unit 90 enables the address, on/off and repeat count counters 82, 86 and 88, respectively, and the address latch 84 in a predetermined sequence in accordance with a prescribed relationship among the link bit and the repeat count of the addressed data word 81, and the on/off count and the repeat count of the on/off and repeat count counters, respectively. In an examplary embodiment, the logic unit 90 comprises a programmable array logic gate which is programmed to execute the sequence of steps illustrated in FIG. 4. Referring to that figure, the logic gate 90 (FIG. 3) begins program execution by initially setting the count of the address counter 82 to zero (step 92). Thereafter, the count of the address counter 82 is stored or latched into the address latch 84 of FIG. 3 (step 94).

Next, the segmentation memory 78 is read, and the repeat count and on/off counters 88 and 86 are loaded with the repeat count and the on/off count, respectively, of the data word 81 read from the segmentation memory (step 96). After step 96, the repeat count of the data word 81 is tested to determine whether the value thereof is greater than zero (step 98). In practice, the repeat count of the data word 81 descriptive of the last region 75 in the last strip 40 on the surface 14 is set equal to zero to indicate that there are no more data words to be read from the segmentation memory 78 of FIG. 3. Thus, when the logic gate 90 determines the repeat count of the data word 81 to be zero, program execution ends (step 100) because transfer of the image data from the intensity adjuster 50 of FIG. 2 to the memory 61 of FIG. 2 is now complete.

If the repeat count is found to be non-zero when examined during step 98, then the count of the on/off counter 86 is examined (step 102). The on/off count of the on/off counter 88 represents the number of blocks of 4 pixels each within a particular one of the regions 75-75 (see FIG. 2) within a particular one of the strips 40-40 (see FIG. 2) whose image data are to be stored or skipped, depending on the status of the on/off bit. A non-zero on/off count indicates that part or all of the image data associated with a particular region 75 have yet to be stored or skipped. Accordingly, when the on/off count is found to be non-zero during step 102, the logic gate 90 then enables the on/off counter 86 so that the on/off count thereof will be decremented in response to the nine-bit count of the pixel clock 48 of FIG. 2 (step 104). In this way, the image data produced by each block of four charge-coupled devices 38-38 within the linescan camera 36 of FIG. 2 are stored or skipped.

Following step 104, program execution branches back to step 102. Should the on/off count of the on/off counter 88 be zero when reexamined during step 102, then the logic gate 90 proceeds to examine the status of the link bit of the data word 81 presently on the data lines 79-79 (see FIG. 3) of the segmentation memory 78 of FIG. 3 (step 106).

If the link bit is found to be non-zero (indicating that there is image data not yet stored or skipped for regions 75-75 not yet examined within the strip 40 of FIG. 2), then the address counter 82 is enabled (step 108). Once enabled, the counter 82 increments the count thereof by unity. Next, the segmentation memory 78 is read and the on/off count of the data word 81 located at the address corresponding to the incremented count of the address counter 82 is loaded into the on/off counter 86 (step 110). Thereafter, program execution branches back to step 102.

Should the link bit have the value zero when examined during step 106 (indicating that the image data for all of the regions 75-75 in the particular strip 40 have been stored or skipped), then the repeat count counter 88 is enabled, causing the counter to decrement the repeat count stored therein by unity (step 112). Next, the current value of the repeat count of the repeat count counter 78 is examined (step 114). If the repeat count is found to be zero, indicating that the pattern of regions 75-75 for the particular strip has already been repeated the desired number of times (equal to the repeat count of the data word 81), the address counter 82 is enabled so that the count thereof will be incremented by unity by the counter (step 116). Thereafter, program execution branches to step 94.

Otherwise, when the repeat count of the repeat count counter 88 is not zero, the address counter 82 is loaded with the address stored in the address latch 84 (step 118). This allows the repetition of the image data associated with the regions 75-75 of a first of a set of strips 40-40 having the same pattern of regions. The address latch 84 contains the beginning address of the beginning data word descriptive of the first one of the regions 75-75 which are to be repeated. Following step 118, program execution branches back to step 110.

Figure 5:
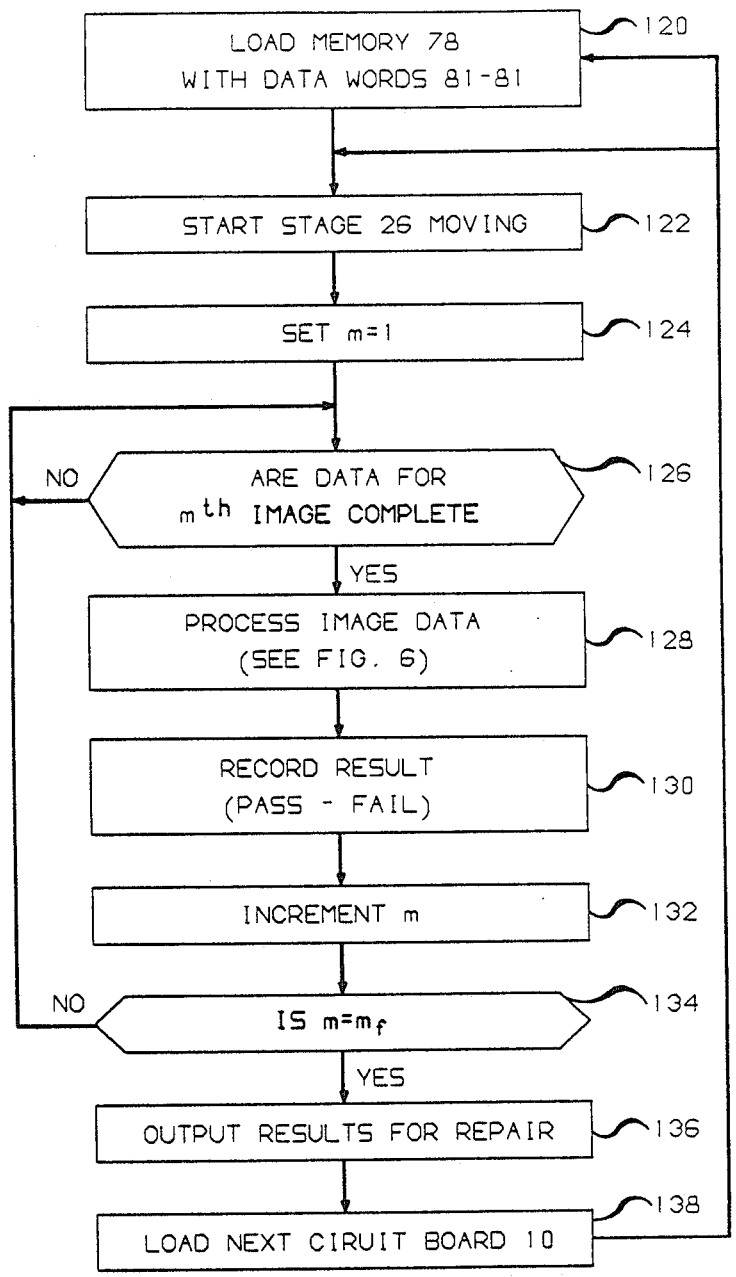
FIG. 5 is a flowchart diagram of a program executed by a processor within the apparatus of FIG. 2 to detect for defects on the surface of the circuit board of FIG. 1.

Referring to FIG. 5, there is shown a flowchart diagram of a program executed by the central processing unit 66 of FIG. 2 to analyze the image data stored in memory 61 of FIG. 2 to determine if defects are present in the predetermined regions 75-75 on the surface 14 of FIG. 2. Execution of the program of FIG. 5 is initiated by loading the segmentation memory 78 of FIG. 3 with the set of data words 81-81 that contains information descriptive of the regions 75-75 (see FIG. 2) within each of the strips 40-40 on the surface 14 of the circuit board 10 of FIG. 2 (step 120). Typically, the on/off bit, link bit, on/off count and repeat count associated with each of the data words 81-81 are determined from data within a computer-aided design (CAD) data base (not shown) which contains information descriptive of locations of the apertures 16-16 and the surrounding rings 17-17 on the surface 14 in the circuit board 10 of FIGS. 1 and 2.

Following step 120, the central processing unit 66 of FIG. 2 commands the stage 26 of FIG. 2 to move along the axis 28 of FIG. 2 (step 122). In this way, the circuit board of FIG. 2 is scanned by the linescan camera 36 of FIG. 2. As the stage 26 moves along the axis 28 of FIG. 2, the output signal of each of the charge-coupled devices 38-38 of FIG. 2 is digitized and then compensated before being stored in the memory 61 of FIG. 2 or skipped in the manner described previously. The rate of movement of the stage 26 along the axis 28 is controlled by the central processing unit 66 to assure sufficient time for the digitized and compensated output signals from the charge-coupled devices 38-38 of the linescan camera 36 to be stored before the next strip is within field view of the linescan camera.

As the image data of the surface 14 of circuit board 10 is being acquired, the central processing unit 66 of FIG. 2 simultaneously analyzes the acquired data to detect for defects on the surface 14 within the predetermined ones of regions 75-75. The central processing unit 66 begins the task of data analysis by initializing a running variable m at unity (step 124). The variable m identifies the image of a particular one of apertures 16-16 of FIG. 2 and its surrounding ring 17. Because the diameter of each ring 17 (e.g., 0.080") is typically larger than the width of each strip 40, the image of each ring and the aperture 16 circumscribed thereby is comprised of the image of portions of several successive strips on the surface 14 of FIG. 2.

Following step 124, the central processing unit 66 determines whether all of the image data representative of the $m^{th}$ aperture 16 and its surrounding ring 17 have been acquired (step 126). Since the analysis of the image data of the surface 14 of FIG. 2 by the central processing unit 66 is undertaken simultaneously with the acquisition thereof, it is possible that all of the image data associated with the $m^{th}$ aperture 16 and its surrounding ring 17 has yet to be acquired. Before the central processing unit 66 can analyze the image of the $m^{th}$ aperture 16 and its surrounding ring 17, all the image data thereof must be available.

To enable the central processing unit 66 to determine whether the necessary image data is available, the central processing unit is provided at the outset of program execution with the addresses of the locations within the memory 61 which are to contain the image data of each of the m apertures 16-16 and the respective surrounding rings 17-17. If, during step 126, the central processing unit 66 of FIG. 2 finds that not all the image data for the $m^{th}$ aperture 16 and its surrounding ring 17 have yet to be stored in the memory 61 at the corresponding locations, then step 126 is re-executed.

When image data comprising the $m^{th}$ aperture 16 and its surrounding ring 17 become available, then the data are processed (step 128) to detect whether the lead 18 extends through the $m^{th}$ aperture beyond the surface 14. In this way, the $m^{th}$ aperture 16 is "inspected." Depending on whether or not the lead 18 is detected, a "pass" or "fail" condition, respectively, is recorded (step 130).

Following step 130, the value of the variable m is incremented by unity (step 132). Thereafter, the value m is compared to a reference value $m_f$ representing the number of apertures 16-16 and surrounding rings 17-17 on the surface 14 of the circuit 10 of FIG. 2. Should m be less than $m_f$, indicating that not all of the apertures 16-16 have been inspected, then program execution branches back to step 126. Otherwise, when m equals $m_f$, then the previously recorded results are output to the terminal 70 of FIG. 2 (step 136) so that the appropriate repair operations may be undertaken on the circuit board 10. Following step 136, the next circuit board 10 is loaded on the stage 26 of FIG. 2 (step 138). Thereafter, program execution branches back to step 120. If, however, the circuit board 10 loaded on the stage 26 of FIG. 2 is identical to the circuit board previously inspected (that is, the apertures 16-16 are in the same positions), then, rather than reloading the segmentation memory 78 of FIG. 2 with the same set of data words 81-81, program execution branches to step 122 instead (as represented by the dashed line).

Even if inspection is desired of regions 75-75 other than those defined by the data words 81-81 currently stored in the segmentation memory 78, all that is required is to load the segmentation memory with a new set of data words defining the desired regions of interest to be inspected.

Figure 6:
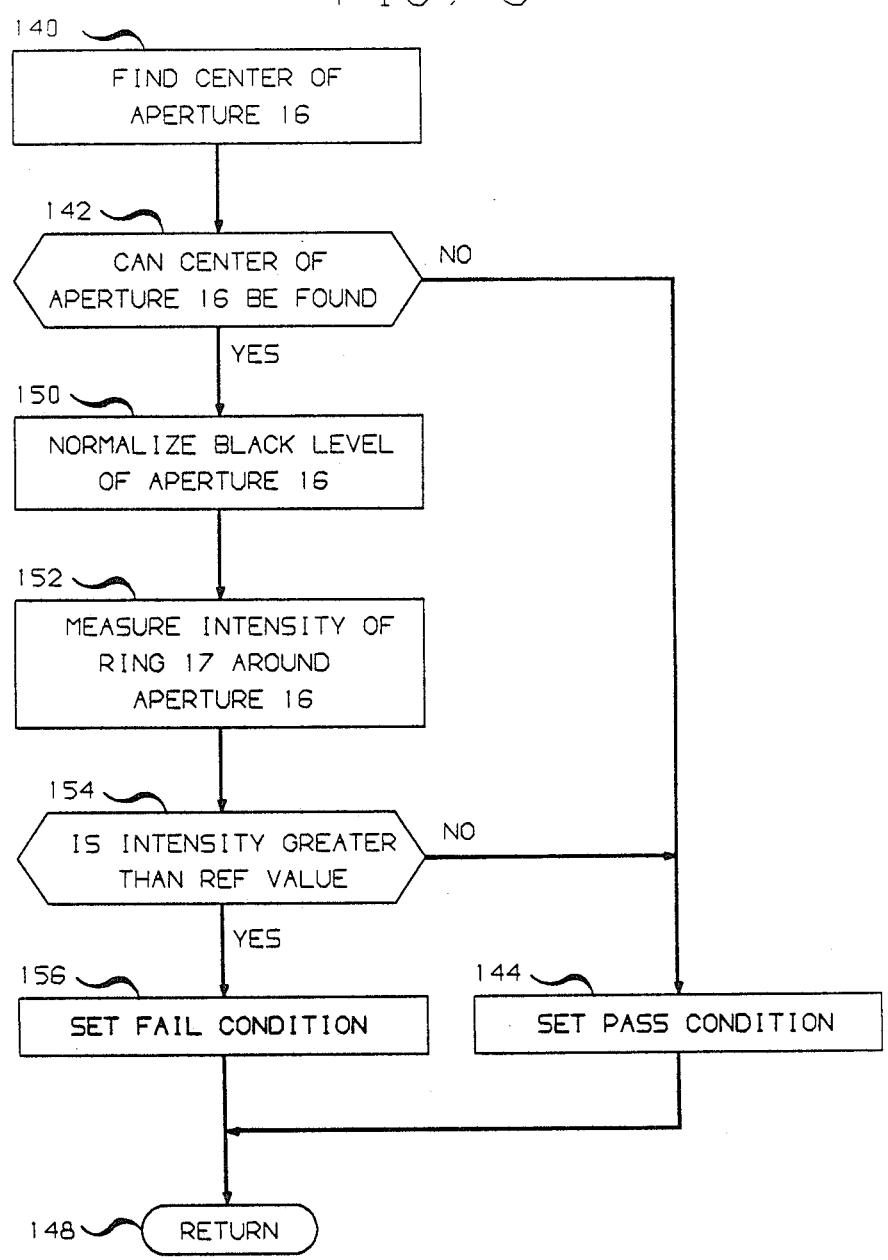
FIG. 6 is a flowchart diagram of a subroutine executed during the program of FIG. 5.

FIG. 6 illustrates a flowchart of the subroutine executed by the central processing unit 66 during step 128 of FIG. 5 to determine whether or not the lead 18 extends through the aperture 16 beyond the surface 14 of FIGS. 1 and 2. Initially, the central processing unit 66 of FIG. 2 tries to find the center of the $m^{th}$ aperture 16 by looking for the edges thereof (step 140). Thereafter, the central processing unit 66 checks whether the center of the aperture 16 has been found (step 142). If the center of the $m^{th}$ aperture 16 cannot be found, it is probably because there is a lead 18 extending through the aperture which has distorted the image thereof. Consequently, when the center of the aperture 16 can't be found, then program execution branches to step 144 during which a pass condition is set. Thereafter, program execution returns (step 148) to the program of FIG. 5.

However, if the center of the $m^{th}$ aperture 16 can be found, then program execution branches to step 150 of FIG. 6 during which the black level of the center of the aperture is normalized; that is, the intensity level thereof is measured and a threshold value is set accordingly. Normalization of the image of the $m^{th}$ aperture 16 and its surrounding ring 17 is accomplished by taking the average of the intensity of the four pixels located closest to the center of the aperture. The purpose in normalizing the image of the aperture 16 is to obtain a base line, dark intensity which can be used for comparison purposes.

Following step 150, the intensity of the light reflected from the ring 17 surrounding the aperture 16 is measured and the intensity of the darkest part of the ring is determined (step 152). Thereafter, the intensity of the darkest part of the ring 17 is compared (step 154) to a predetermined reference value representing the intensity of light reflected from the ring 17 when no shadows have been cast thereon. The reference value is set in accordance with the threshold value established during step 150. If the intensity value of the darkest part of the ring 17 is less than the referance value, then it is probable that a shadow has been cast on the ring by the lead 18 protruding beyond the aperture 16. Therefore, program execution branches first to step 144 during which the pass condition is set before returning (step 148). Otherwise, program execution branches to step 156 during which a fail condition is set. After either of steps 144 or step 156, program execution returns (step 148) to the program of FIG. 5.

While the apparatus 24 of FIG. 2 has been described as being operative to inspect for a particular kind of defect on the circuit board 10, i.e., missing or misinserted component leads 18-18, the apparatus can inspect for other kinds of defects as well. For example, the apparatus 24 of FIG. 2 is operative to detect whether a known type of component 20' (see FIG. 7) is mounted with its leads 18'-18' solder bonded to a pair of metallized areas 158-158 on the surface 12 of the circuit board. Each component 20' is designated as a "surface-mounted" device because of the manner in which the leads 18'-18' are mounted directly on the surface 12 of the circuit board 10. In contrast, each component 20 is designated as a "through-hole" device because of the manner in which the leads 18-18 thereof are inserted through the apertures 16-16 for solder bonding to the metallized rings 17-17 (see FIG. 2) on the undersurface 14 (see FIG. 2) of the circuit board 10.

Figure 7:
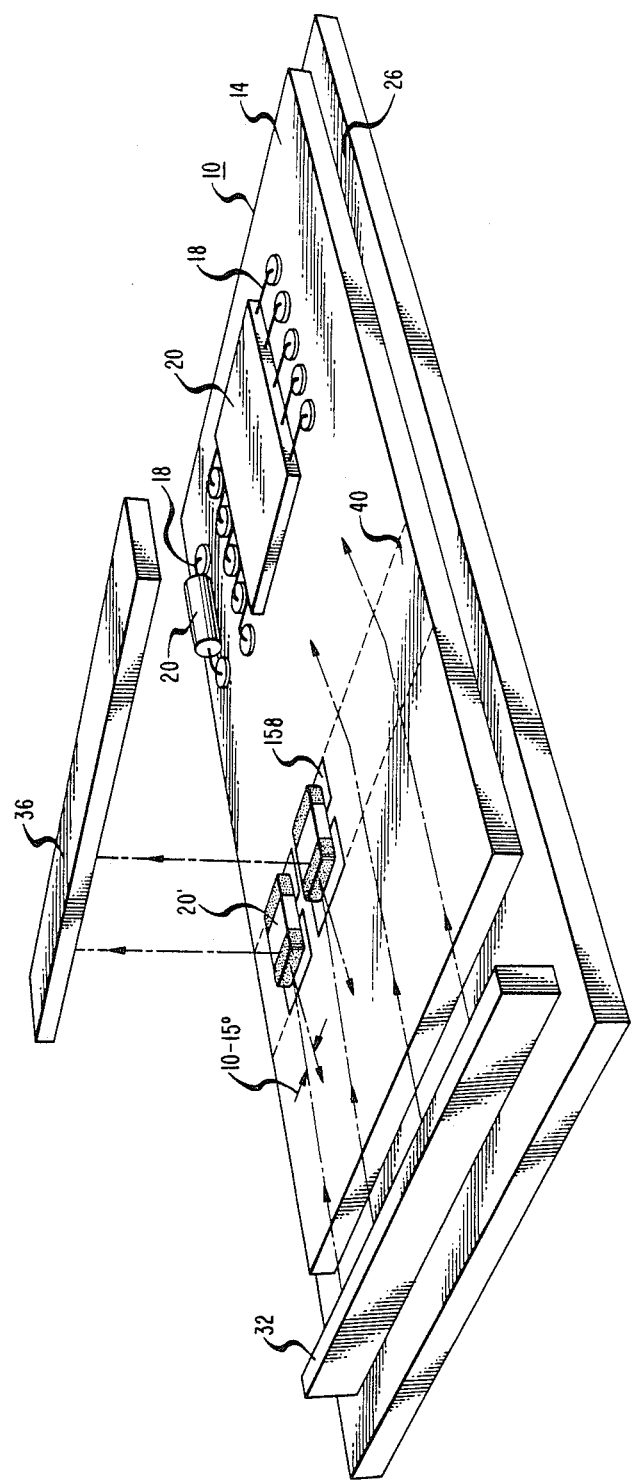
FIG. 7 is a perspective view of a circuit board having both surface-mounted and through-hole components thereon.
Figure 8:
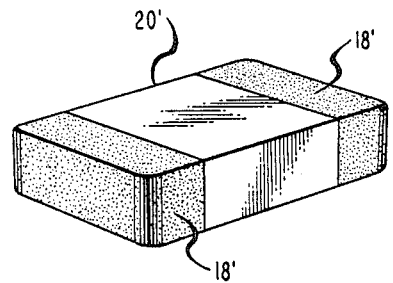
FIG. 8 is a perspective view of a surface-mounted component of the type mounted to the circuit board of FIG. 7.

In an exemplary embodiment, each surface-mounted component 20' shown in FIG. 7 is a discrete device, taking the form of a capacitor or resistor. As best seen in FIG. 8, each component 20' is comprised of a body having a rectangular cross section. The leads 18'-18' on each component 20' comprise a pair of metallized bands each surrounding a separate one of the ends thereof. The leads 18'-18' are at right angles to the sides of the component 20'.

In order to utilize the apparatus 24 to detect if a known type of component 20' is mounted on the surface 12 of the circuit board 10, the position of the lamp 32 must be adjusted so that the rays 34-34 radiated thereby are directed towards the surface 12 at an acute angle (e.g., 10°-15°) therewith. The position of the linescan camera 36 must be adjusted so that only the light rays 34-34 which are reflected substantially normal to the plane of the circuit board 10 are seen thereby. To achieve far more even illumination of the surface 12 of circuit board 10, it may be desirable to provide a second lamp (not shown) which is positioned so that the light rays therefrom strike the board at the same angle as, but in a direction opposite to, the rays 34 from the lamp 32.

The purpose in adjusting the lamp 32 and the linescan camera 36 in the manner described above is to minimize the intensity of the light rays 34-34 reflected by the metallized areas 158-158 into the camera. The metallized areas 158-158 are specular but planar. Thus the light rays 34-34 striking the metallized areas 158-158 at an acute angle are reflected therefrom at an acute angle and, therefore, are not seen by the linescan camera 32.

The leads 18'-18' are also specular because they are typically coated with solder. However, the rays 34-34 striking the leads 18'-18' are reflected therefrom in a direction substantially normal to the surface 12 of the circuit board 10 and are seen by the linescan camera 36.

In practice, the top surface of each component 20' lying between the leads 18'-18' may also be specular. Thus, the linescan camera 36 may see the entire area of the top surface of each component 20', not just the leads 18'-18'.

In addition to adjusting the lamp 32 and the linescan camera 36, the program of FIG. 5 must be modified. First, during step 120 of FIG. 5, the memory 78 of FIG. 3 must be loaded with a set of data words 81-81 (see FIG. 3) describing the regions of interest in each strip 40 lying within the area surrounding each pair of metallized areas 158-158 which mount one of the components 20'-20'. Further, during step 126 of the program of FIG. 5, the central processing unit 66 must check whether the image of the $m^{th}$ pair of metallized areas 158-158 (the $m^{th}$ image) has been acquired rather than that of the $m^{th}$ aperture 16 of FIG. 2.

Figure 11:
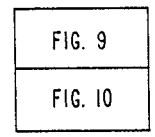
FIG. 11 illustrates the manner in which FIGS. 9 and 10 should be viewed to understand the order of the steps of the program represented thereby.

The program of FIG. 5 must further be modified so that during step 128, the $m^{th}$ image is processed to determine whether the proper component 20' has been placed in the $m^{th}$ pair of the metallized areas 158-158. To accomplish this task, the program of FIG. 6 must be replaced with a program shown in flowchart form in FIGS. 9 and 10, which are to be viewed jointly in the manner shown in FIG. 11. Execution of the program is begun when the central processing unit 66 executes the start step (step 160). During the step 160, all program variables are initialized. Also, data indicative of the location of the metallized areas 158-158 on the surface 12 of the circuit board 10 of FIG. 7 and the type of the components 20'-20' to be mounted thereon are loaded into the memory 61 (see FIG. 2). In practice, such data is provided from the CAD data base (not shown) established during design of the circuit board 10.

Before step 160 is completed, the central processing unit 66 establishes the expected width and length of each of the components 20'-20' which are mounted on the metallized areas 158-158 of FIG. 7. In the exemplary embodiment, the circuit board 10 contains only four different types of components 20' (types 1206, 1210, 1812 and 1825) whose respective lengths and widths are listed in Table II below, which is contained in the memory 61 (see FIG. 2).

TABLE II

| Component Type | Length (mils) | × | Width (mils) |
|---|---|---|---|
| 1206 | 120 | | 60 |
| 1210 | 120 | | 100 |
| 1812 | 180 | | 120 |
| 1825 | 180 | | 250 |

From the information received from the CAD data base as to the type of component 20' which should be mounted on a particular pair of metallized areas 158-158, the central processing unit 66 can establish the correct width and length for that component from the data contained in Table II. Due to manufacturing tolerances, the actual length and width of the components 20'-20' of FIG. 7 may vary by as much as 10%.

Following step 160, the central processing unit 66 establishes a binarized or threshold value for the intensity of each pixel captured by each charge-coupled device 38 of FIG. 2 (step 162). The actual or gray scale intensity of each pixel is still retained in the memory 61. The central processing unit 66 sets the binarized intensity value for each pixel at zero when the actual pixel intensity is below a certain maximum value. The purpose in according each pixel a zero binary intensity under such conditions is to eliminate electrical noise due to low light levels. Further, when the actual pixel intensity is above a certain predetermined maximum value, the binary pixel intensity value is also set to zero. The reason for doing so is to reduce the problem of blooming of the linescan camera 36 caused by the spillage of charge from one the charge-coupled devices within the camera onto an adjacent charge-coupled device. The spillage of charge onto an adjacent charge-coupled device causes the latter device to falsely register that light of a very high intensity is incident thereon which is undesirable.

Figure 10:
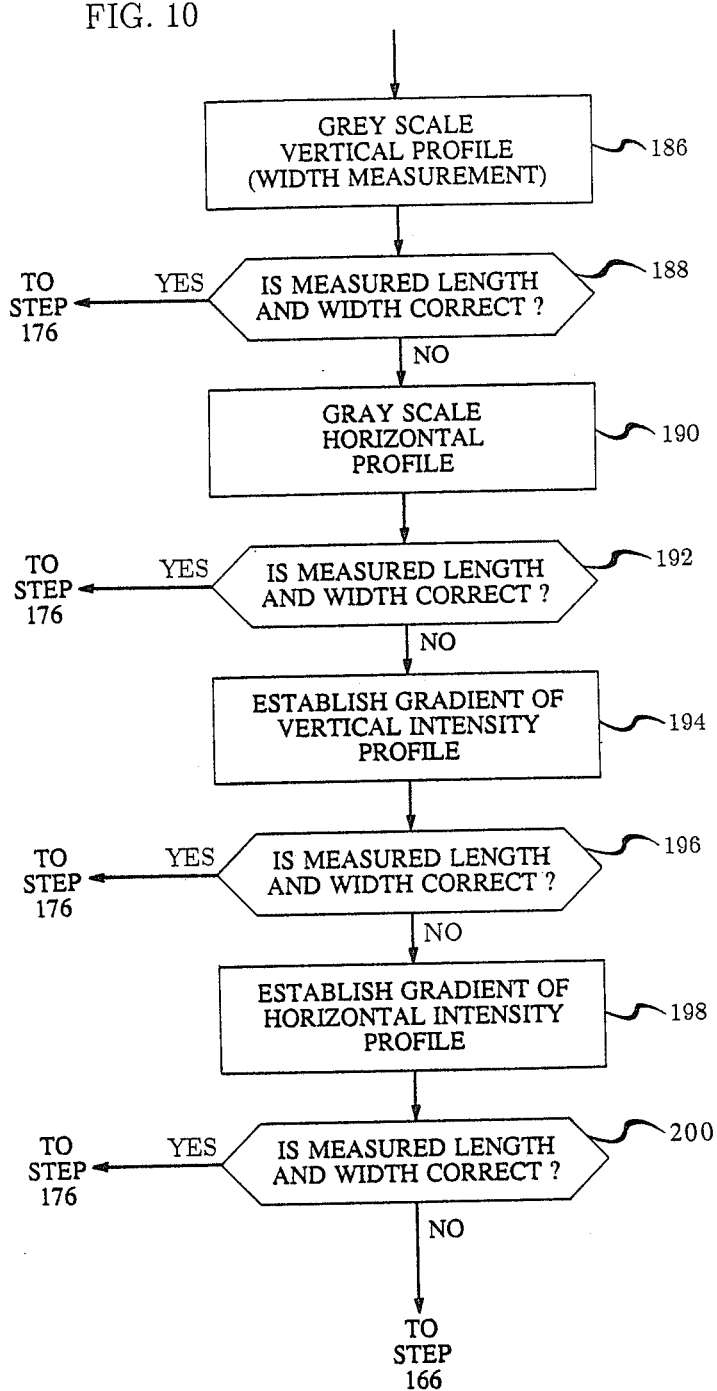

Following step 162, the central processing unit 66 checks whether a component 20' is mounted on the $m^{th}$ pair of metallized areas 158-158 of FIG. 7. To understand how the central processing unit 66 accomplishes this task, reference should be had to FIG. 12 which illustrates an array or grid of boxes. Each box within FIG. 10 represents one of the pixels, which together comprise the image of a small area on the surface 12 (see FIG. 7) of the circuit board 10 of FIG. 7 encompassing the component 20' mounted on the $m^{th}$ pair of metallized areas 158-158. The pixels represented by the boxes in the array of FIG. 12 lying wholly outside of the component 20' will typically have a zero binary intensity value because the area on the surface 12 of the circuit board 10 lying outside the component typically reflects little if any light into the linescan camera 36 of FIG. 2. Those pixels corresponding to the boxes within the array which lie partly or wholly within the area occupied by the component 20' will have a non-zero binary intensity value. The reason for this is that the leads 18'-18' and typically, the area on the top surface of the component 20' lying between the leads, are light reflective and are thus seen by the linescan camera 36.

Figure 12:
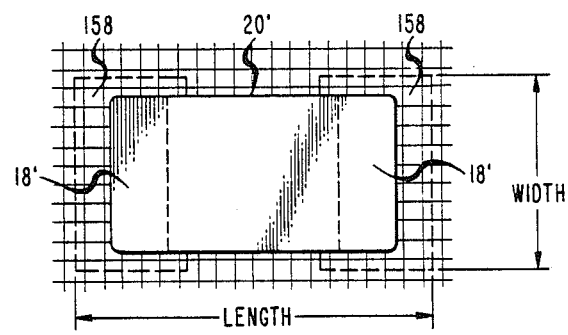
FIG. 12 is a diagram of an array or grid representing the pixels comprising the image of the component of FIG. 8.

To ascertain whether there is a component 20' mounted to the metallized areas 158-158 of FIG. 7, the central processing unit 66 (see FIG. 2) sums the binarized intensity value of the pixels within each horizontal row of the array of pixels represented by the grid of boxes of FIG. 12. When the component 20' is present, then there will be at least two rows of pixels which are spaced more than a predetermined distance apart, and whose intensity sum is greater than a predetermined value. To determine if the component 20' is present, the central processing unit 66 examines the sum of the pixels within each horizontal row to determine if this condition is met. If this condition is not met, then the central processing unit 66 indicates a "fail" condition (step 166), signifying the absence of the component 20', before exiting the program (step 168) and returning to the program of FIG. 5.

Figure 9:
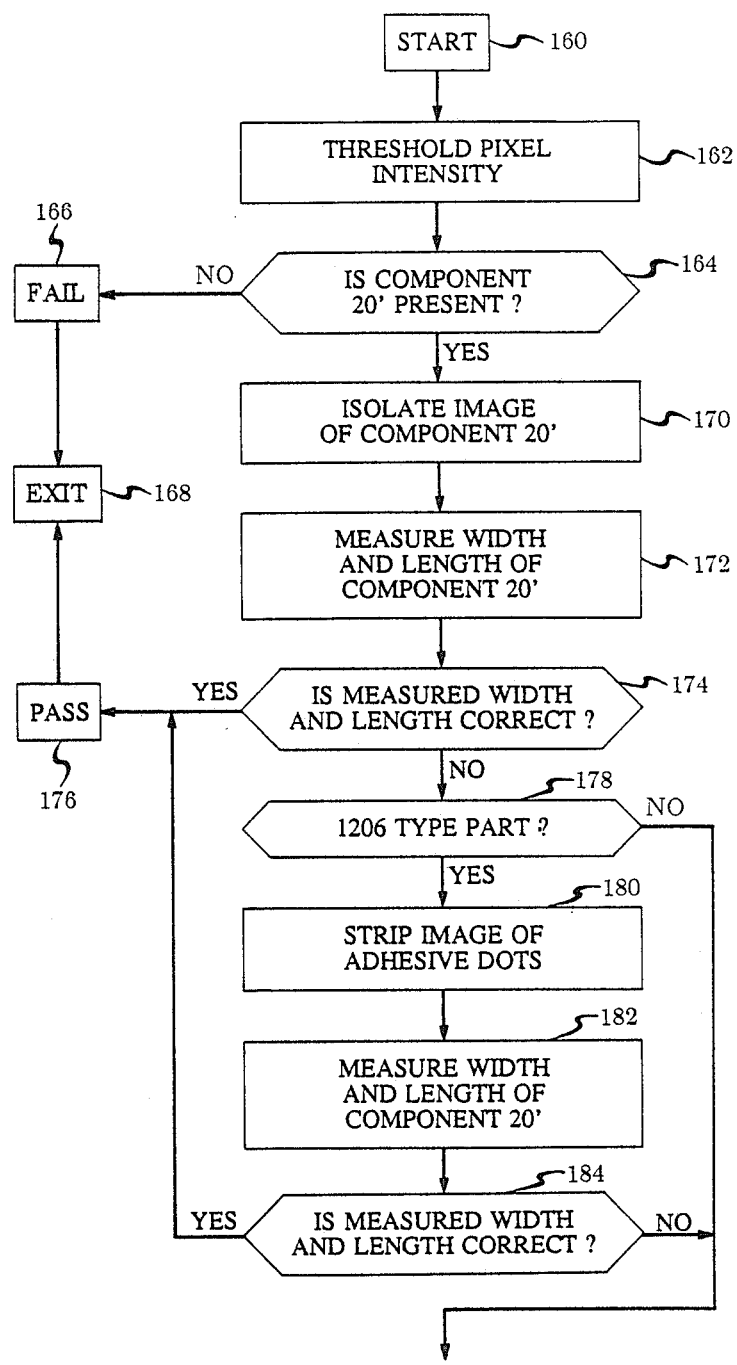
FIGS. 9 and 10 together present a flowchart diagram of a program executed by the processor of FIG. 2 in place of the program of FIG. 6.

Referring to FIG. 9, when a component 20' is detected, then program execution branches to step 170. During step 170, the central processing unit 66 examines the image of the component 20' to determine if it also contains the image of any neighboring components. If so, then the image of the component 20' is isolated from that of any neighboring component(s). The central processing unit 66 isolates the image of the component 20' by first locating which two vertical columns of pixels in the array represented by the grid of FIG. 12 have both a non-zero pixel intensity sum and which each lie inside of a column whose pixel intensity sum is zero. Each of the two columns of pixels which satisfy these conditions corresponds to a separate one of the ends of the component 20'. Once the ends of the component 20' have been located, then any bright images appearing outside of each end of the component 20' are ignored.

Following step 170, the width and length of the observed component 20' are then measured (step 172). In order to measure the length of the component 20', the central processing unit 66 determines the distance between the ends of the component which were located during step 170. The width of the component 20 is measured by first locating which of the two rows of pixels has both a non-zero intensity sum and which each lie inside a row having a zero pixel intensity sum. The distance between these rows corresponds to the width of the component.

After step 172, the measured width and length of the component 20' are compared to the known width and length, respectively, of the component mounted on the $m^{th}$ pair of metallized areas 158-158 of FIG. 7 (step 174). If the measured width and length differ from the known width and length, respectively, of the component 20' by less than a predetermined tolerance factor, then a "match" occurs. A match indicates that the proper component 20' is mounted on the $m^{th}$ pair of metallized areas 158-158. When a match is found, a "pass" condition is indicated (step 176), signifying that the correct size component 20' is mounted to the $m^{th}$ pair of metallized areas 158-158. Thereafter, program execution branches to step 168. When a match is not found, then program execution branches to step 178.

During step 178, a determination is made whether the component 20', known to be mounted on the $m^{th}$ pair of metallized areas 158-158, is a type 1206 component. If the component 20' is of the type 1206, or in the case where the $m^{th}$ pair of metallized areas 158-158 is to mount a smaller component, then program execution branches to step 180. During step 180, the image of the component 20' of FIG. 7 is processed to strip away the image of any adhesive blobs (now shown in FIG. 12) appearing therein. In practice, each of the components 20'-20' has adhesive applied to the undersurface thereof to adhere the component to the circuit board 10 of FIG. 7 prior to solder bonding of the leads 18'-18' to the metallized areas 158-158. Sometimes, the adhesive applied to the undersurface of each component 20' tends to ooze out from the sides thereof, forming an adhesive blob adjacent thereto. Such adhesive blobs are generally hemispherical in shape and are often very specular, thus reflecting light into the linescan camera 36 of FIG. 7.

The adhesive blobs vary in size but typically are less than 50 mls in diameter. Thus the presence of adhesive blobs adjacent to the sides of the component 20' tends to adversely affect the length and width measurement thereof only when the component is very small. When the component 20' is as small as or smaller than the 1206 type, it is therefore desirable to process the image thereof to remove any adhesive blobs appearing therein.

To process the image of the component 20' to remove any adhesive blobs appearing therein, the image of the middle of the component, lying between the leads 18'-18' (as represented by the dashed lines in FIG. 12), is automatically made to appear black. To make the middle of the image of the component 20' appear black, the central processing unit 66 locates each of a pair of vertical columns of pixels spaced a short lateral distance (typically 20 mils) inside of each of the ends of the component. The portion of the image of the component 20', lying between each of these two columns of pixels, is then blackened by causing those pixels lying inside of these two columns to have a zero binary intensity.

Next, the width and length of the component 20 are again measured (step 182) in the same manner as described above with respect to step 172. The length measurement will remain the same as before step 180. However, the width measurement made during step 182 will be affected since the image of any light reflective areas located at least 20 mils inside each of the ends of the component 20' now appear black. Thus any horizontal row of pixels within the array represented by the grid of FIG. 10, which prior to step 182 had a non-zero pixel intensity sum, due solely to the presence of an adhesive blob, will now have a zero pixel intensity sum. The length and width determined durng step 182 are then compared to the known width and length of the component 20' (step 184) to determine whether a match has occurred. If a match has occurred, then program execution branches to step 176.

Should the measured length and width of the component 20' not match the known width and length, or when the component is not a 1206 type or smaller, program execution branches to step 186. During step 186, the actual or gray scale intensity of each of the pixels comprising the image of the component 20' is first retrieved from the memory 61 and then this information is filtered to enhance (i.e., increase) the intensity of the edges and the sides of the component 20'. Also during step 186, a histogram or profile of the gray scale pixel intensity sum of the columns in the array of FIG. 12 is established by the central processing unit 66. The adjective "vertical" will hereinafter be employed when referring to the intensity profile established during step 186. A plot of the vertical intensity profile established by the central processing unit 66 is seen in FIG. 13.

Figure 13:
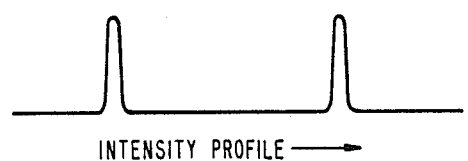
FIG. 13 is a profile of the intensity of the image of FIG. 12 after processing.

Referring to FIG. 13, ideally, the vertical intensity profile will have two very sharp peaks, each corresponding to a separate one of the ends of the component 20'. The distance between the peaks corresponds to the distance between the ends of the component 20'. Thus by determining the distance between the peaks in the vertical intensity profile of FIG. 13, the length of the between the peaks in the vertical intensity profile of FIG. 13, the length of the component 20' can be measured. Following step 186, a check is made to determine whether the length of the component 20' measured during step 182, and the width of the component, as measured during either of steps 182 or 186 match the known length of the component (step 188).

If the length of the component 20' measuring step 182 matches the known length thereof, and the width measured during either of steps 182 and 186 matches the known width, the program execution branches to step 176. Otherwise, program execution branches to step 190, during which the central processing unit 66 sums the gray scale intensity of the pixels in each horizontal row of the array of pixels represented by the grid of FIG. 12. Also during step 190 the central processing unit 66 establishes a profile of the just-computed gray scale pixel intensity sum of each of the horizontal rows. The adjective "horizontal" will hereinafter be used to reference the intensity profile established during step 190. Ideally, the horizontal intensity profile established by the processor 66 during step 190 will have two sharp, spaced peaks because the gray scale pixel intensity data had previously been filtered to enhance the sides of the component 20. By enhancing the sides of the component 20', as compared to the other portions of the image thereof, it follows that each of the two rows of pixels within the array of FIG. 11, corresponding to the sides will have a greater pixel intensity sum.

The horizontal intensity profile (not shown) will appear very similar to the plot of the vertical intensity profile illustrated in FIG. 13. The only difference is that the spacing between the peaks of the horizontal intensity profile will be smaller. The reason is that the spacing between the peaks in the horizontal intensity profile corresponds to the spacing between the component sides which is typically smaller than the spacing between the component ends. The width of the component 20' can be obtained by measuring the spacing between the peakds in the horizontal intensity profile.

After step 190, a check is made to determine whether the width of the component 20' measured during either of steps 182 and 186 matches the known component width (step 192). Also, during step 192, a check is made to determine whether the length measured during either of steps 182 and 190 matches the known length of the component 20'. If a match is found between the known width and length of the component 20' and either of the two measured widths and either of the two measured lengths, respectively, then program execution branches to step 176.

Should no match be found, then program execution branches to step 194. During step 194, the central processing unit 66 computes the gradient of that portion of the vertical intensity profile corresponding to each end of the component 20'. To compute the gradient, the central processing unit 66 computes the difference between the pixel intensity sum of those vertical columns in the array of pixels represented by the grid of FIG. 12 in the region about each of the ends of the component 20'. The gradient computed by the central processing unit 66 will have two very sharp maxima separated from each other a distance equal to the length of the component 20'. Thus once the central processing unit 66 has computed the gradient, the length of the component 20' is determined therefrom.

Following step 194, a check is made to determine whether the width of the component 20' measured during any of the steps 182, 186 and 194 matches the known width and whether the length measured during steps 182 and 190 matches the known length (step 196). If a match is found, then program execution branches to step 176. Should none of the measured lengths and widths match the known width and length of the component 20', then program execution branches to step 198.

During step 198, the central processing unit 66 computes the gradient of the horizontal intensity profile within each of the two regions thereof corresponding to the sides of the component 20'. The gradient of the horizontal intensity profile is computed in a fashion similar to the manner in which the gradient of the vertical intensity profile was computed during step 194. The gradient of the horizontal intensity profile will have two very sharp peaks separated from each other by a distance corresponding to the width of the component 20'. Thus, once the central processing unit 66 computes the gradient of the horizontal intensity profile, the width is then easily computed therefrom.

After step 198, a check is made as to whether any of the widths measured during steps 182, 186 and 194 and any of the lengths measured during steps 182, 190 and 196 match the known width and length, respectively, of the component 20' (step 200). If so, then program execution branches to step 176; otherwise, program execution branches to step 166 where a fail condition is designated before exiting the program during step 168.

The above-described program efficiently tests for the existence and placement of the proper component 20' on the m$^{th}$ pair of metallized areas 158-158. At any time a match between the measured width and length and the known width and length, respectively, of the component 20' is found, a branch occurs back to the program of FIG. 5. Thus, oftentimes, it is not necessary to completely execute the program of FIG. 9 to fully inspect for placement of the proper component 20' on the m$^{th}$ pair of metallized areas 158-158. Only when no match is found following a comparison of the measured widths and lengths to the known values therefor does the program of FIG. 9 continue executing in order to measure the length and width of the component by different techniques.

It is to be understood that the embodiments described herein are merely illustrative of the principles of the invention. Various modifications and changes may be made thereto by persons skilled in the art which will embody the principles of the invention and fall within the spirit and scope thereof.

What is claimed is:

1. A method for fabricating an article, comprising the steps of:
   mounting at least one device to a substrate; and
   inspecting at least one surface of said substrate to detect defects associated with the mounting of said device to said substrate, said inspecting step including the steps of:
   directing light towards said substrate;
   sensing, at a light-sensing means, the light reflected from a thin strip of surface area running across said surface of said substrate, said strip configured of at least one region; and
   imparting a relative motion between said substrate and said lightsensing means so that said light-sensing means senses the light reflected from successive strips of surface area and produces output signals which vary accordingly, characterized in that said inspecting step further includes the steps of:
   processing the output signals of said light-sensing means to obtain image data representative of the actual intensity of each of a plurality of picture elements comprising the image of each of said successive strips of surface area; and
   retaining only the image data representative of the picture elements within each region of interest in each strip by:
   (a) providing a description for a first strip within each successive group of at least one strip having a like configuration of regions, said description indicating (1) the length and location of the regions in each said first strip, (2) which of the regions is of interest, and (3) the number of successive strips having a like configuration of regions;
   (b) selectively storing the image data in accordance with the description of each said first strip; and
   analyzing the retained image data to detect defects associated with the mounting of said device to said substrate.

2. The method according to claim 1, characterized in that said processing step comprises the sub-steps of:
   (a) converting the output signals of said light-sensing means into a stream of digital signals, each representing the actual intensity of each said picture element within each strip of surface area;
   (b) selecting, from said stream of digital signals, those digital signals representing the picture elements within each predetermined region of interest within each strip of surface area; and
   (c) storing said selected digital signals.

3. The method according to claim 2, characterized in that prior to said selecting step, the value of each of said digital signals within said stream of digital signals is adjusted to compensate for nonuniform illumination of the surface of the substrate.

4. The method according to claim 2, characterized in that said selecting step comprises the sub-steps of:
   (a) providing a plurality of data words, each containing information descriptive of the characteristics of a successive one of a plurality of regions within each strip of surface area and containing information indicative of whether the region is of interest;
   (b) reading a successive one of said data words to determine the characteristics of the region described thereby;
   (c) identifying the groups of digital signals within said stream which collectively represent the image of the region described by said just-read data word;
   (d) selecting the group of digital signals previously identified when said just-read data word indicates the region is of interest; and
   (e) repeating the steps of (b)-(d) until all said data words have been read and each of said groups of digital signals representing said regions of interest within each of said strips of surface area is selected.

5. A method for fabricating an article, comprising the steps of:
   mounting at least one device to a substrate; and
   inspecting at least one surface of said substrate to detect defects associated with the mounting of said device to said substrate, said inspecting step including the steps of:
   directing light towards said substrate;
   sensing, at a light-sensing means, the light reflected from a thin strip of surface area running across the surface of the substrate, said strip configured of at least one region of predetermined length; and
   imparting a relative motion between said substrate and said light sensing means so that said light-sensing means senses the light reflected from successive strips of surface area and produces signals which vary accordingly, characterized in that said inspecting step further includes the steps of:
   (a) converting the output signals of said light-sensing means into a stream of digital signals, each representing the actual intensity of each said picture element within each strip of surface area;
   (b) providing a plurality of streams of data words, the words in each stream containing information descriptive of (1) the characteristics of said regions within a strip, (2) which of the regions is of interest, and (3) how many successive strips have a like configuration of regions;
   (c) reading a successive one of said data words within a sucessive one of said streams to determine the characteristics of a successive one of the regions within each of said strips;
   (d) identifying the groups of digital signals within said stream of signals which collectively represent the image of each region described by said just-read data word;

(e) selecting said group of identified signals when the just-read data word idicates the region described thereby is of interest;

(f) repeating steps (c)-(e) until all the data words descriptive of the regions within said first strip have been read; and (g) successively re-reading each of the data words associated with said first strip and successively repeating steps (d) and (e) for as many times as there are successive strips having a like configuration of regions.

6. The method according to claim 1, characterized in that said analyzing step comprises the steps of:

determining, from the retained image data, whether said device is mounted to said surface of said substrate, and if so, then measuring the width and length of said device;

comparing said measured width and length of said device to a known width and length; and indicating that said device present on said surface is of said known width and length when the difference between said measured and known width and the difference between said measured and known length are each within a predetermined tolerance factor.

7. A method of fabricating an article, comprising the steps of:

mounting at least one device to a substrate; and inspecting at least one surface of said substrate to detect for defects associated with the mounting of said device to said substrate, the inspecting step including the steps of:

directing light towards said substrate;

sensing, at a light-sensing means, the light reflected from a thin strip of surface area running across said surface of said substrate; and imparting a relative motion between said substrate and said lightsensing means so that said light-sensing means senses the light reflected from successive strips of surface area and produces output signals which vary accordingly, characterized in that said inspecting step further includes the steps of:

processing the output signals of said light-sensing means to obtain image data of each of said successive strips of surface area and retaining only the image data representative of predetermined regions of interest on said surface of said substrate; and analyzing said retained image data to detect for defects associated with mounting of said device to said substrate, said analyzing step including the steps of:

performing a first logical operation to detect the presence of said device on said surface of said substrate, and if so, performing a first one of several additional logical operations on the retained image data to measure the width and length of said device mounted on said surface;

comparing said measured width and length of the device to a known width and length, respectively;

indicating that said device present on said surface is of a known width and length only if the differences between said measured and known width and said measured and known length are each within a predetermined tolerance factor; and if not successively performing another one of said additional logic operations and then performing said comparing and indicating steps until each of said additional logical operations on the retained image data has been performed.

8. The method according to claim 1, characterized in that:

said device is mounted to said substrate by inserting at least one lead on said device through an aperture in said substrate surface; and said retained image data is analyzed to detect for the absence of said lead extending through said aperture in said substrate surface.

9. A method for fabricating an article comprising the steps of:

mounting at least one component to a circuit board; and inspecting at least one surface of said circuit board to detect defects associated with the mounting of said component to said circuit board, said inspecting step including the steps of:

directing light towards said circuit board;

sensing at a light-sensing means the light reflected from a thin strip of surface area running across the surface of the circuit board, said strip configured of at least one region;

imparting a relative motion between said circuit board and said light-sensing means so that said light-sensing means senses the light reflected from successive strips of surface area and produces output signals which vary accordingly, characterized in that said inspecting step further includes the steps of:

processing the output signals of said light-sensing means to obtain image data representative of the actual intensity of each of a plurality of picture elements comprising the image of each of said successive strips of surface area;

retaining only the image data representative of the picture elements within each region of interest in each strip by:

(a) providing a description for a first strip within each successive group of at least one strip having like configuration of regions, said description indicating (1) the length and location of the regions in each said first strip, (2) which regions are of interest, and (3) the number of successive strips having a like configuration of regions; and (b) selectively storing the image data in accordance with the description of each said first strip; and analyzing the retained image data to detect defects associated with the mounting of said component to said circuit board.

10. The method according to claim 9, characterized in that said processing step comprises the sub-steps of:

(a) converting said output signals of said light-sensing means into a stream of digital signals, each representing the intensity of each picture element within the image of each strip of surface area;

(b) selecting, from the stream of digital signals, those digital signals each representing the picture element within each predetermined region of interest within each strip of surface area; and (c) storing the selected digital signals.

11. The method according to claim 10, characterized in that prior to said selecting step, the value of each of said digital signals within said stream of digital signals is adjusted to compensate for nonuniform illumination of the surface of said circuit board.

12. The method according to claim 10, characterized in that said selecting step comprises the sub-steps of:

(a) providing a plurality of data words, each containing information descriptive of the characteristics of a successive one of a plurality of regions within each strip of surface area on said circuit board and containing information indicative of whether the region is of interest;

(b) reading a successive one of said data words to determine the characteristics of the region described thereby;

(c) identifying the groups of digital signals within said stream of digital signals which collectively represent the image of the region described by said just-read data word;

(d) selecting the group of digital signals previously identified when said just-read data word indicates the region is of interest; and (e) repeating the steps of (b)-(d) until all of said data words have been read and each of the said groups of digital signals indicative of the regions of interest within each of said strips surface area is selected.

13. A method for fabricating an article, comprising the steps of:

mounting at least one component to a circuit board;

inspecting at least one surface of the circuit board to detect defects associated with the mounting of said component to said circuit board, said inspecting step including the steps of:

directing light towards said circuit board;

sensing, at a light-sensing means, the light reflected from a thin strip of surface area running across the surface of the circuit board, said strip configured of at least one region of predetermined length; and imparting a relative motion between said circuit board and said light sensing means so that said light-sensing means senses the light reflected from successive strips of surface area and produces output signals which vary accordingly, characterized in that said inspecting step further includes the steps of:

(a) converting the output signals of said light-sensing means into a stream of digital signals each representing the actual intensity of each said picture element within each strip of surface area;

(b) providing a stream of data words, the words in each stream containing information descriptive of (1) the characteristics of said regions within each strip, (2) which of the regions is of interest, and (3) how many successive strips have a like configuration of regions;

(c) reading a successive one of the data words within each successive stream of data words to determine the characteristics of a successive one of said regions in each strip;

(d) identifying the groups of digital signals within said stream which collectively represent the image of each region described by said just-read data word;

(e) selecting said group of identified signals when the region is of interest;

(f) repeating the steps (c)-(e) until all the data words descriptive of the regions within each said first strip have been read; and (g) successively re-reading each of the data words associated with said first strip and successively repeating steps (d) and (e) for as many times as there are successive strips having a like configuration of regions.

14. An apparatus for acquiring data indicative of predetermined regions of interest on a surface of a substrate comprising:

means for directing light towards the surface of the substrate;

means spaced from said substrate for sensing the intensity of the light reflected from a thin strip of surface area running across the surface of the substrate, and for producing an output signal which varies accordingly; and means for imparting a relative motion between said intensity-sensing means and said substrate to cause the output signal of said intensity-sensing means to vary in accordance with the intensity of the light reflected from each of a plurality of successive strips of area on the surface of the substrate, each said strip comprised of at least one region, characterized in that said apparatus further comprises:

means for processing the output signals of the intensity-sensing means to obtain image data representative of the actual intensity of each picture element within the image of each of the successive strips of surface area and for retaining that image data representative of the picture elements within the predetermined region of interest in each strip; said processing means including:

means for providing a description for a first strip in each successive group of at least one strip having a like configuration of regions, said description indicating (1) the length and locations of the regions in each said first strip, (2) which of the regions is of interest, and (3) the number of successive strips having a like configuration of regions; and means for selectively storing the image data in accordance with the description of each said first strip.

15. The apparatus according to claim 14, characterized in that said apparatus further comprises:

means for analyzing the retained image data to detect for defects on the substrate within the predetermined regions of interest.

16. The apparatus according to claim 14, characterized in that said intensity-sensing means comprises a linescan camera.

17. The apparatus according to claim 16, characterized in that said processing means comprises:

an interface for converting the output signal of the linescan camera into a stream of digital signals, each representing the actual intensity of each picture element within the image of each strip;

control means coupled to said interface for selecting, from the stream of digital signals produced by the interface, those digital signals representing the picture elements within the image of each predetermined region of interest in each strip; and memory means for storing the signals selected by said control means.

18. The apparatus according to claim 17, characterized in that said interface means comprises:

an analog-to-digital converter for producing a stream of digital signals varying in accordance with the output signal of said linescan camera; and a free-running clock for producing a monotonically increasing count identifying each of the digital signals within said stream of signals produced by said analog-to-digital converter.

19. An apparatus for acquiring data indicative of predetermined regions of interest on a surface of a substrate comprising:

means for directing light towards the surface of the substrate;

a linescan camera spaced from the substrate for sensing the intensity of the light reflected from a thin strip of surface area running across the surface of the substrate, and for producing an output signal which varies accordingly;

means for imparting a relative motion between said linescan camera and said substrate to cause the output signal of said camera means to vary in accordance with the intensity of the light reflected from each of a plurality of successive strips of area on the surface of the substrate, each said strip comprised of at least one region, characterized in that said apparatus further comprises:

means for processing the output signals of the intensity-sensing means to obtain image data representative of the actual intensity of each picture element within the image of each of the successive strips of surface area and for retaining that image data representative of the picture elements within the predetermined regions of interest in each strip, said processing means including:

an interface for converting the output signals of the linescan camera into a stream of digital signals each representing the picture elements within the image of each strip;

control means coupled to said interface means for selecting from the stream of digital signals produced by the interface means, those digital signals representing the images of each predetermined region of interest in each strip, said control means including:

(a) a first memory for storing the signals selected by said control means;

(b) a second memory for storing a plurality of data words, each containing a count indicative of how many picture elements comprise each region within a strip, and each data word containing a control bit which determines whether the image data representative of the corresponding region are to be stored in the first memory;

(c) an address counter coupled to said second memory for addressing a selected one of the data words stored therein;

(d) a counter for decrementing the count of the just-addressed data word; and (e) a logic gate coupled to said address counter for enabling the address counter to address another data word in said second memory when said counter has decremented the count of the previously addressed data word to zero.

20. The apparatus according to claim 17, characterized in that said apparatus further includes means for adjusting the value of each of the digital signals within the stream of digital signals produced by said interface means to compensate for nonuniformities in the illumination of the substrate.

* * * * *